United States Patent [19]

Lunt

[11] 4,305,567

[45] Dec. 15, 1981

[54] VALVE STEM SEAL

[75] Inventor: William G. Lunt, Monroeville, Pa.

[73] Assignee: Rockwell International Corporation, Pittsburgh, Pa.

[21] Appl. No.: 128,227

[22] Filed: Mar. 7, 1980

Related U.S. Application Data

[63] Continuation of Ser. No. 828,947, Aug. 29, 1977, abandoned.

[51] Int. Cl.³ .................. F16K 41/04; F16J 15/22; F16J 15/24
[52] U.S. Cl. .................. 251/214; 277/102; 277/125; 277/204; 277/DIG. 6; 428/408; 428/422
[58] Field of Search ............. 137/246, 246.13, 246.12, 137/246.22; 156/188; 251/214, 281, 283, 309, 312; 277/27, 102, 103, 110, 112, 125, DIG. 6, 204; 428/408, 402, 409, 422

[56] References Cited

U.S. PATENT DOCUMENTS

| | | | |
|---|---|---|---|
| 1,205,345 | 11/1916 | Hatfield | 277/204 |
| 1,671,603 | 5/1928 | Nordstrom | 137/246.12 |
| 2,819,919 | 1/1958 | Pearce et al. | 277/204 |
| 2,945,668 | 7/1960 | Staller | 251/283 |
| 3,096,070 | 7/1963 | Wolfensperger | 251/214 |
| 3,108,018 | 10/1963 | Lewis | 428/408 |
| 3,186,681 | 6/1965 | Lowrey | 251/214 |
| 3,231,235 | 1/1966 | Anderson et al. | 251/214 |
| 3,404,061 | 10/1968 | Shane et al. | 428/408 |
| 3,406,707 | 10/1968 | Schenck, Jr. | 251/214 |
| 3,537,682 | 11/1970 | Priese | 251/214 |
| 3,586,289 | 6/1971 | Priese | 251/214 |
| 3,627,258 | 12/1971 | Scaramucci | 251/309 |
| 3,859,160 | 1/1975 | Marin | 428/408 |
| 4,034,776 | 7/1977 | Eshghy | 251/283 |
| 4,068,853 | 1/1978 | Schnitzler | 277/102 |
| 4,116,451 | 9/1978 | Nixon et al. | 277/DIG. 6 |
| 4,118,532 | 10/1978 | Homsy | 428/408 |

FOREIGN PATENT DOCUMENTS 1191647  5/1970  United Kingdom .......... 277/DIG.6

*Primary Examiner*—George L. Walton

[57] ABSTRACT

A valve comprises a casing having a passageway therethrough for the flow of fluid and a bore intersecting the passageway. A flow regulating member is rotatably mounted in the bore for blocking the passageway in the valve closed position of the flow regulating member. The flow regulating member has a port therethrough for connecting and being in communication with the passageway in the valve open position. The flow regulating member and the casing define a first chamber at one end of the flow regulating member. A stem is rotatably mounted within the casing and is mechanically coupled to the flow regulating member to rotatably drive the flow regulating member within the casing. The stem has an annular rim formed toward and positioned within the first chamber. At least one annular seal surrounds the stem to effect the seal between the stem and casing. Valving and/or porting is provided for introducing a pressure equal to or greater than the line pressure into the first chamber whereby the pressure acts on the annular rim to move the stem in an axial direction to compress the annular seals which are alternate layers of polytetrafluoroethylene and graphite.

4 Claims, 10 Drawing Figures

VALVE STEM SEAL

This is a continuation of application Ser. No. 828,947, filed Aug. 29, 1977, now abandoned.

BACKGROUND OF THE INVENTION

1. Field of the Invention

This invention relates to seals for valves and, more particularly, to seals for valves that have rotating stems.

2. Description of the Prior Art

The prior art is replete with various forms of valves and seals therefor; a number of which are directed to the resolution of the problem of maintenance and integrity of the stem seals which effect the rotating seal between the casing and valve stem.

In addition to the above noted problem area and also related thereto is the problem of providing a valve which can be readily maintained in a field environment and, more particularly, a provision of a valve which may be maintained without any interruption of the flow in the line with which it is associated. One of the more typical field maintenance tasks is the replacement of the stem seals and it is important that the valve continue to function at least temporarily while these seals are being replaced.

In addition to the above noted problems, there has been a continual need for the provision of a new and improved packing seal for valves having roting stems as contrasted to those having rising stems; particularly plug valves whose plug and coupled stem are rotated through a limited arc. The seals must have a number of characteristics to enable it to perform effectively in such an environment. For example, a stem seal in a plug valve environment should possess a substantial degree of lubricity to reduce friction with respect to the stem and also reduce the wear on the seals themselves. With respect to this latter point, the life of the seal can be extended substantially if the friction between it and the various moving parts of the valve with which it is associated can be reduced. Another important function of the seal is to maintain its own strength characteristics during its operational life. This particular feature of the seal becomes all the more important when it is compressed by a gland ring or the like.

Examples of typical prior art forms of valves in this general area and other art which may relate thereto are as follows: U.S. Pat. Nos. 1,584,699; 1,671,603; 1,680,812; 2,945,668; 3,096,070; 3,115,151; 3,231,235; 3,406,707; 3,537,682 and 3,586,289.

SUMMARY OF THE INVENTION

It is, therefore, a primary object of the present invention to provide a valve which comprises a casing having a passageway therethrough for the flow of fluid and a bore intersecting the passageway. A flow regulating member is rotatably mounted in the bore for blocking the passageway in the valve closed position of the flow regulating member. The flow regulating member has a port therethrough for connecting and being in communication with the passageway in the valve open position. The flow regulating member and the casing define a first chamber at one end of the flow regulating member. A stem is rotatably mounted within the casing and is mechanically coupled to the flow regulating member to rotatably drive the flow regulating member within the casing. The stem has an annular rim formed toward and positioned within the first chamber. At least one annular seal surrounds the stem to effect the seal between the stem and casing. Means are provided for introducing a pressure equal to or greater than the line pressure into the first chamber whereby the pressure acts on the annular rim to move the stem in an axial direction to compress the annular seals which are alternate layers of polytetrafluoroethylene and graphite.

It is another object of the present invention to provide a seal for a valve having a rotating stem which seal comprises materials having compatability with a wide variety of mediums.

It is yet another object of the present invention to provide a seal for valves having rotating stems which seal comprises materials having significant temperature ranges beyond that of rubber and other conventional sealing materials.

It is another primary object of the present invention to provide a packing seal for valves comprising a packing ring having radially alternate compressed layers of polytetrafluoroethylene and graphite. The polytetrafluoroethylene layer is formed from a continuous ribbon of polytetrafluoroethylene and the graphite layer is formed from a continuous ribbon of graphite.

It is another object of the present invention to provide a packing seal for valves wherein the graphite layer is substantially, approximately five times, thicker than the polytetrafluoroethylene layer.

A still further object of the present invention is to provide a packing seal for valves wherein each layer is compressed into a serpentine configuration in cross section.

Another object of the present invention is to provide a packing seal for valves wherein the ring is compressed to approximately 50% of its original height.

Yet another object of the present invention is to provide a packing seal for valves wherein each of the continuous ribbons are of equal height and are wrapped to form the seal one ribbon superimposed on the other.

A further object of the present invention is to provide a packing seal for valves wherein the continuous ribbon of polytetrafluoroethylene is substantially U-shaped in cross section and is wrapped to form the seal with the graphite ribbon being inserted within the U-shaped polytetrafluoroethylene ribbon.

A further primary object of the present invention is to provide a packing seal for valves comprising the steps of wrapping about a mandrel at least two ribbons, one of graphite and one of polytetrafluoroethylene to form multiple alternate layers of the ribbons and compressing the alternate wrapped ribbons to form a seal.

Another object of the present invention is to provide a packing seal for valves wherein the ribbons are compressed into a forming cup.

A still further object of the present invention is to provide a packing seal for valves wherein the ribbons are compressed to approximately 50% of their original height.

Yet another object of the present invention is to provide a packing seal for valves wherein the ribbon of polytetrafluoroethylene is formed into a U-shaped cross section and the graphite ribbon is inserted within the U-shaped polytetrafluoroethylene ribbon before compressing the ribbons.

It is a still further object of the present invention to provide a tapered plug valve which is highly effective and efficient and which includes a unique and advanced stem seal.

It is yet another object of the present invention to provide a tapered plug valve which may be effectively serviced in a field environment.

It is still another object of the present invention to provide a tapered plug valve which is inexpensive to manufacture yet is highly reliable and easily maintained.

Yet another object of the present invention is to provide a valve wherein the flow regulating member is a tapered plug rotatably mounted in the bore which is tapered to conform to the tapered plug with the plug and casing defining the first chamber at the smaller end of the plug.

Another object of the present invention is to provide a tapered plug valve wherein the outside diameter of the annular rim formed on the stem is less than the inside diameter of the first chamber.

Still another object of the present invention is to provide a tapered plug valve wherein a ring surrounds the stem to rotate therewith. The ring has a radially extending face which sealingly contacts the annular seal.

A further object of the present invention is to provide a tapered plug valve wherein a pressure tight seal is effected by the annular seal with moving contact between the outer surface of the stem and the inward facing surface of the annular seal and between the radially extending face of the ring and the radially extending surface of the annular seal in contact with the radially extending face.

Still further object of the present invention is to provide a tapered plug valve wherein the means for introducing a pressure to the first chamber includes valving means for the introduction of a pressurized sealant lubricant medium into said first chamber and into grooves provided on the outer surface of the plug.

Another object of the present invention is to provide a tapered plug valve which includes a pressure responsive valve means in the plug to allow line pressure to enter the first chamber when the pressure in the first chamber is reduced to a level below line pressure.

Still another object of the present invention is to provide a tapered plug valve wherein there is a first chamber at the smaller end of the plug and means to introduce pressure equal to line pressure into the second chamber to dynamically balance the plug within the casing.

It is still another object of the present invention to provide a tapered plug valve having a plurality of seals comprised of a material having a high lubricity to reduce the friction between the seals and the outer surface of the stem and the radially extending face of the ring.

Another object of the present invention is to provide a tapered plug valve wherein the casing is provided with an annular lip surrounding the stem in the area of the first chamber and having a radially extending inward facing surface which acts as a backseat for a radially extending face provided on the annular rim.

Yet another object of the present invention is to provide a tapered plug valve wherein the ring is seated on the outer cylindrical surface of the stem and a radially extending surface on the stem.

A still further object of the present invention is to provide a tapered plug valve wherein the pressure responsive valve means includes a ball check valve in a bore in the plug between the passageway and the first chamber which is unseated when the pressure in the first chamber is reduced to a level below line pressure.

Still another object of the present invention is to provide a tapered plug valve wherein biasing means is provided between the stem and the plug to bias the plug toward its larger end. The biasing means is a spring member received within a cavity in the stem.

Further objects and advantages of the present invention will become apparent as the description proceeds in connection with the appended claims and annexed drawings described below.

DESCRIPTION OF THE INVENTION

Figure 2:
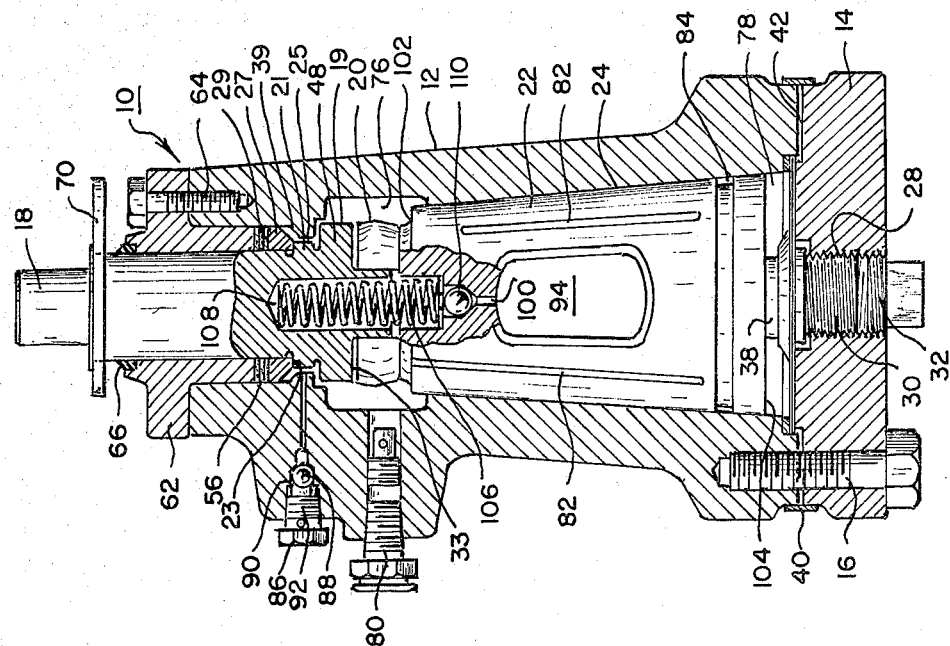
FIG. 2 is another sectional view of the tapered plug valve in accordance with the present invention wherein the tapered plug valve in FIG. 1 is rotated approximately 90 degrees.

Referring now to the drawings, there is shown an improved tapered plug valve 10 according to a preferred embodiment of the present invention. The tapered plug valve 10 is highly adaptable to many applications and requirements as is well known by those having ordinary skill in this art. For example, the tapered plug valve as contemplated by this invention may be used in oil and gas production, refining and transmission apparatus, flow systems of all kinds and the like.

The tapered plug valve 10 is provided with a casing 12. Typically, the casing 12 is a cast part which, in turn, is machined and otherwise suitably prepared for the operational introduction of its various parts. The casing 12 is so arranged as to receive an end cap 14. The end cap 14 may be adapted to the casing by suitable attaching means such as a series of threaded bolts 16. With the end cap removed, all the various operational parts, which will be below further described, may be introduced into the casing 12, i.e., the stem 18, coupling member or equalizing ring 20 and plug 22 may all be loaded or assembled within the casing from the bottom.

The stem 18 is rotatably mounted within the casing 12 and is mechanically coupled to the equalizer ring 20. The equalizer ring 20 is mechanically coupled to the plug 22 which is rotatably mounted within the casing 12 at a tapered interface 24. As can immediately be seen, rotation of the stem 18 will, in turn, cause rotation of the plug 22 through the equalizer ring 20 which mechanically couples the stem 18 to the plug 22. The end cap 14 is also provided with a threaded cavity 28 which is adapted to threadably receive a plug adjusting screw 30 and a protective cap 32. The plug adjusting screw 30, as the name implies, is adapted to adjust the axial position of the plug 22 within the casing 12. This adjustment is achieved through the provision of a spherical plug thrust ball 34 supported within a cavity 36 in the lower end of the plug 22 and on ball seat 38. The ball seat 38 is responsive to axial movement of the plug adjusting screw 30 which, for example, when threadably moved inwardly with respect to the end cap 14 drives the plug 22 and thereby drives the spherical plug thrust ball 34 toward the apex of the taper.

A band seal 40 may also be provided around the juncture of the casing 12 and end cap 14 to seal the void 42 between the two members from the environment. The sealing of the void is further enhanced by the provision of a grease fitting 44 provided in a bore 46 in the end cap 14 for applying grease under pressure to the above noted void 42. It should be noted that the grease will completely fill the void 42 and surround the threaded bolts 16 thereby preserving the threads on the threaded bolt 16 from any adverse substance or environment.

The stem 18, as before mentioned, is rotatably supported within the casing 12. The stem 18 is provided with an annular rim 48 which is located in the area of the upper chamber 76. The upper chamber 76 will be described in further detail below. The annular rim 48 may be formed integrally with the stem 18 and is generally of a lesser diameter than the interior of the upper chamber 76. More particularly, the outside diameter 19 of the annular rim 48 is of a lesser diameter than the inside diameter of the upper chamber 76 and freely rotates there within. The stem 18 is further provided with an additional annular rim 21 which has a radially extending surface 23 facing outwardly from the upper chamber 76. This annular rim 21 may also be formed integrally with the stem 18 to rotate therewith. As with the annular rim 48, the outer surface 25 of the annular rim 21 is of a lesser diameter than the inner surface of the upper chamber 76 so as to allow it to freely rotate therein.

The plug valve 10 is further provided with a ring 27 which surrounds the stem 18 and rotates therewith. The annular ring 27, while being generally fixedly attached to the stem 18 by means of a close fit thereon, does not contact the inner surface of the casing but rotates with the stem free and clear thereof.

Figure 1:
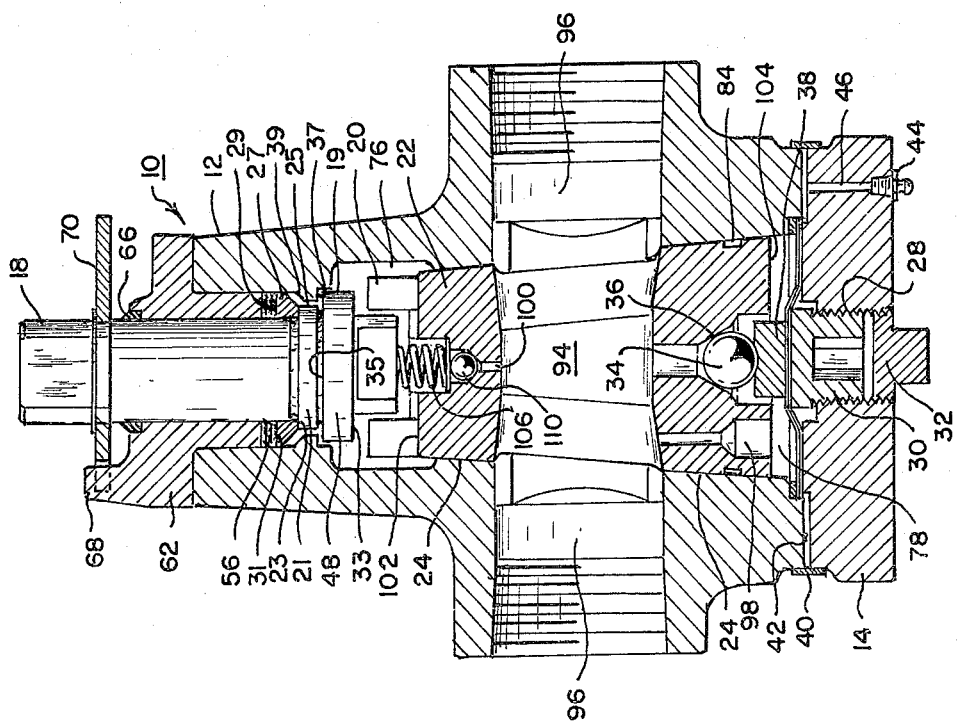
FIG. 1 is a partial sectional view of a tapered plug valve in accordance with the present invention.

A plurality of annular packing seals 56 are provided in the casing above the ring 27 and below the stem cap 62. As can be seen in FIGS. 1 and 2, the stem cap 62 is fixedly attached to the casing 12 by suitable fastening means such as a series of threaded bolts 64. The stem cap 62, in addition to providing a positive positioning means for the seals 56, also provides for the environmental sealing of the stem by the provision of a weather seal 66 as typically manufactured by Johns Manville as their Wiper Construction II, Type P. The stem cap 62 performs the further function of acting as a stop member in that a stop member portion 68 may be formed on the stem cap 62 to coact with a stop collar 70 which is affixed to the stem 18 to rotate therewith. The stop collar 70 is provided with a cut away section 72 with lands 74 at each end thereof which restrict the rotational movement of the stem 18 to a predetermined arc. The restriction of the movement of the stem 18 is effected by the stop collar 70 abutting the stop member 68 at either of its lands 74.

As can be seen in either of the sectional views of the valve 10, the casing 12 and the tapered plug 22 define an upper chamber and a lower chamber 78. A check valve assembly 80 is provided for the introduction of a sealant lubricant into the upper chamber 76 and the sealant lubricant may be introduced therein under pressure. The sealant lubricant, as it flows into and fills the upper chamber 76, will also flow into axially extending grooves 82 and circumferential grooves 84. As the name sealant lubricant implies, the material serves the dual purpose of lubricating the various operational parts of the valve 10 while at the same time seals the plug with respect to the casing.

The casing 12 is provided with a radially extending port which is in communication with a pressure relief screw arrangement 86. The pressure relief screw arrangement 86 includes a partially threaded cavity 90 disposed within the casing 12. The pressure relief screw arrangement 86 relieves the line pressure in the first chamber 76 when the cap 68 is removed. Suitable stop means such as a solid spherical ball 88 is received within the threaded cavity 90 and is seated in the cavity 90 on a ball seat (not shown). The spherical ball 88 is maintained on the ball seat in a sealed condition by a set screw 92 which is threadably received within the threaded cavity 90.

The plug valve is immune to the lockup phenomenon by the provision of dynamically balancing the plug 22 in the casing 12 when the plug 22 is partially or fully open, i.e., when the port 94 of the plug 22 is connected to and in communication with the passageway 96 through the casing 12. The dynamic balancing feature of the valve 10 is achieved by the provision of a first axially extending opening 98 in the plug 22 connecting the port 94 to the lower chamber 78 and the provision of a second axially extending opening 100 in the plug 22 connecting the port 94 to the upper chamber 76. The opening 98 may be offset from the longitudinal axis of the plug 22 while the opening 100 may also be disposed from the longitudinal axis.

At this juncture, it can be seen that the pressure seen by the port 94 when the plug 22 is in its partially open or fully open position is also simultaneously seen by the upper chamber 76 and the lower chamber 78. Accordingly, the pressure seen by the chambers 76 and 78 will also be seen by the smaller end 102 of the plug 22 and the larger end 104 of the plug 22, respectively. Hydraulic pressure exerted on the smaller end 102 and the larger end 104 of the plug 22 will tend to maintain the axial position of the plug 22 with respect to the tapered interface 24 within the casing 12 at all times even through pressure and temperature transient. However, there has been noted that there will tend to be a slight unequal pressure exerted toward the apex of the taper due to secondary forces such as the relatively large cross sectional areas of the larger end 104 with respect to the smaller end of the plug as well as the unequal weight distribution of the plug 22, i.e., the plug obviously is heavier at its larger end than at its smaller end. Depending upon the position of the valve with respect to its associated line, gravity, therefore, may also play a role in axially dislocating the plug 22 along its longitudinal axis. To offset these secondary forces, a helically wound spring 106 which may be disposed on the longitudinal axis of the plug 22 biases the plug 22 along the longitudinal axis away from the apex of the taper. The spring 106 may be received within a cavity 108 in the stem and, as before mentioned, abuts and biases the plug 22. Therefore, the plug 22 will see virtually no axially dislocating forces as it experiences pressure and temperature transient in its partially open or fully open position. The avoidance of such axial dislocation of the plug also avoids the lockup phenomenon in that the plug 22 maintains its axial position within the casing 12 and is not driven into the taper and thus pinched by the casing after the stabilization of a pressure or temperature transient.

The second axially extending opening 100 is also provided with a spherical ball 110 seated therein. The spherical ball, which is not biased by the spring 106, is free floating within the second axially extending opening and serves as a check valve, checking the flow of the sealant lubricant into the port 94 of the plug 22 when the sealant lubricant is introduced into the upper chamber 76 under pressure.

Figure 3:
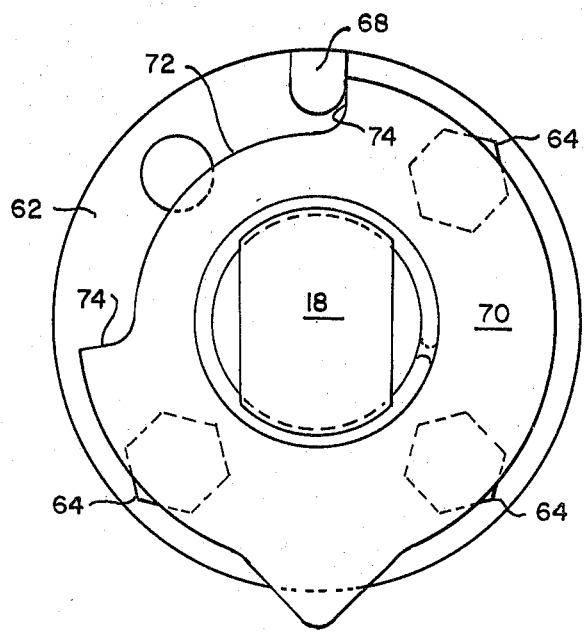
FIG. 3 is a top view of the tapered plug valve of FIG. 1.
Figure 4:
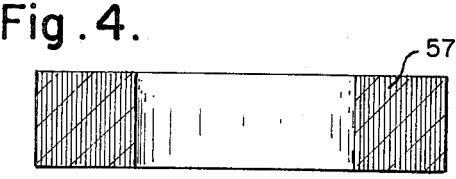
FIG. 4 is a cross sectional view of one of the seals used in the plug valve of FIG. 1 in its uncompressed state.
Figure 7:
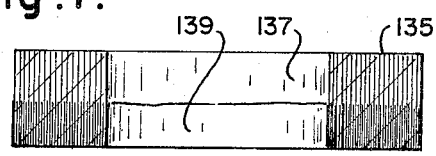
FIG. 7 is a cross sectional view of yet another type of seal that might be used in the plug valve of FIG. 1 in its uncompressed state.
Figure 5:
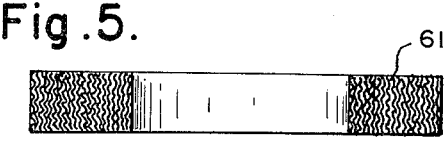
FIG. 5 is a cross sectional view of the seal of FIG. 4 in its compressed state.
Figure 8:
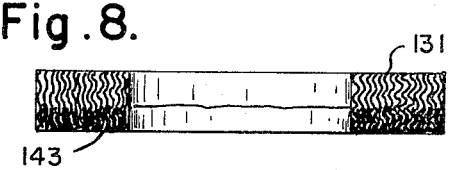
FIG. 8 is a cross sectional view of the seal of FIG. 7 in its compressed state.

The new and improved sealing means 56 comprises a plurality of annular rings and, as shown in the plug valve of FIGS. 1-3, there are three such rings. The three rings, as will be further described and discussed, are fixed at an axial position along the stem between stem cap 62. In the plug valve 10 of FIG. 1 the ring 27 exerts a compressing load on the seals 56. The points of rotating contact of the seals 56 with respect to the stem 18 and ring 27 will be explained in further detail below but it should be pointed out that these seals are not necessarily limited to a plug valve as herein described. The seals as contemplated by the present invention, while being particularly adapted for such applications, can be used in other applications where their unique characteristics are found to be applicable. As can be seen in FIGS. 4-10, the new and improved seals 56 generally comprise radially alternate compressed layers of polytetrafluoroethylene and graphite. More particularly, it can be seen in FIG. 6 that the seal of FIG. 4 is formed by wrapping a ribbon of polytetrafluoroethylene 51 and a ribbon of graphite 53. These ribbons which are substantially the same height are wrapped about a mandrel 55 to form the uncompressed ring 57 as illustrated in FIG. 4 in which each alternate strata is polytetrafluoroethylene and graphite. The polytetrafluoroethylene may be one of many commercially available forms such as TEFLON (a trademark of E. I. Dupont DeNemours & Co.). The graphite similarly can be purchased commercially such as GRAFOIL (a trademark of Union Carbide). The ribbons 51 and 53 are wrapped about the mandrel 55 in such a fashion as to generally approximate the final dimensions of the sealing chamber into which it is to be inserted (both inside and outside diameters thereof). The height, however, of the ribbons is generally twice as great as the desired final dimension. After the ring 57 is formed it is compressed within a forming cup 59 by a suitable compressing means (not shown) such that it is compressed to approximately one-half the height of the ring 57 to form the ring 61 as shown in FIG. 5. It can be seen from the cross section of FIG. 5 that the relatively parallel ribbon strata of FIG. 4 has been compressed into a generally serpentine configuration, i.e., each alternate layer has been compressed such that they follow a serpentine or sinusoidal path.

Figure 6:
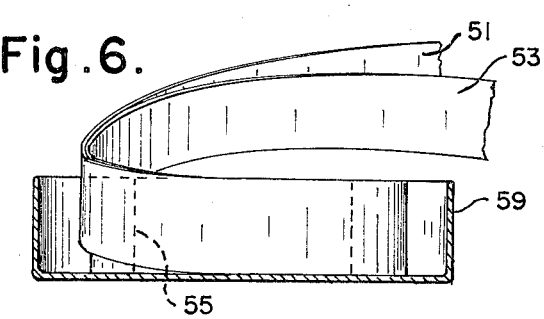
FIG. 6 illustrates the wrapping of the seal of FIG. 4.
Figure 9:
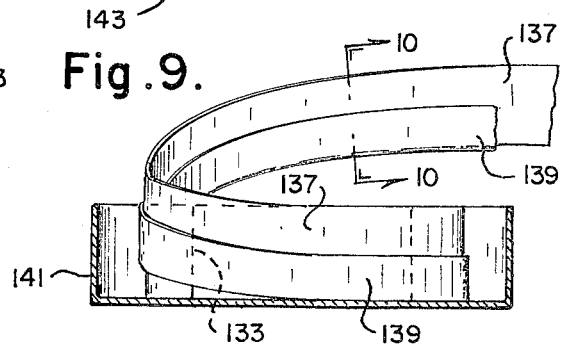
FIG. 9 illustrates the wrapping of the seal of FIG. 7.
Figure 10:
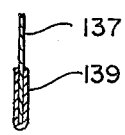
FIG. 10 is a cross sectional view of the ribbons of FIG. 9 taken along the line 10—10.

Referring now to FIGS. 7-10, there is shown another improved seal 131 which also employs alternate strata of polytetrafluoroethylene and graphite as was employed in the seal 61 of FIGS. 4-6. As can be seen in FIG. 9, the seal is formed by wrapping two ribbons about a mandrel 133 to form the uncompressed ring 135 of FIG. 7. While the ribbon 137 of graphite is wrapped about the mandrel in a manner similar to that as shown in FIG. 6, there is a difference in the configuration of the polytetrafluoroethylene ribbon 139. This can be best seen in FIG. 10, which is a sectional view taken along line 10—10 of FIG. 9. The polytetrafluoroethylene ribbon 139 is formed in a substantially U-shaped manner and the graphite ribbon 137 is inserted within the U-shaped polytetrafluoroethylene 139. Accordingly, as these two ribbons in the above noted configuration are wrapped about the mandrel 133, the uncompressed seal 135 is formed with each U-shaped polytetrafluoroethylene ribbon being concentrated at one end thereof. As with the previously described seal, the uncompressed seal 135 is compressed to substantially one-half of its original height within the forming cup 141 by suitable forming means (not shown) to form the seal 131 of FIG. 8. The seal 131 of FIG. 8 in its compressed state presents a lower radially extending face 143 comprised entirely of polytetrafluoroethylene whose purpose will be defined and discussed below.

As before mentioned, the ring 27 is generally fixedly attached to the stem 18 to rotate therewith and, therefore, it will have moving contact at its radially extending face 29 with the radially extending face 31 defined by the downward facing face of the lowermost seals 56. In addition, the seals 56 will have moving contact with the outer surface of the stem 18. As indicated above, the upper chamber 76 sees the higher of line pressure or sealant lubricant pressure. This pressure will act upon the various surfaces of the annular rims 21 and 48 which are generally located within the upper chamber 76. It can be seen from FIGS. 1 and 2 that such pressure will tend generally to bias the stem 18 along its longitudinal axis generally outwardly away from the plug. More particularly, it can be seen from FIGS. 1 and 2 that the pressure will act upon the lower radially extending face 33 of the annular rim 48 and the overall differential biasing force generated thereby will tend to move the stem 18 outwardly away from the plug 22. As the stem 18 moves in such a direction the annular rim 21 will act upon the ring 27 which, in turn, will be biased along the same direction as stem 18. The ring 27 which rotates with the stem 18 will thereupon tend to compress the seals against the stationary stop member 68 which is bolted to the casing 12. As the ring 27 compresses the seals 56 they will tend to be forced in greater intimate contact with the stem 18 to further effect the seal therebetween. Additionally, the ring 27 will be forced in greater intimate contact with the seals 56 at its radially extending face 29. As before mentioned, there will be rotating contact between the outer surface of the stem 18 and the seals 56 as well as between the seals 56 and the radially extending face of the ring 27.

The seals 56 may comprise three separate rings. The lowermost ring of the seals 56 would typically be ring 131 of FIG. 8. More particularly, it can be seen that the radially extending polytetrafluoroethylene face 143 of ring 131 would be in moving contact with the radially extending face 31 of the ring 27. In addition, the upward projecting alternate layers of the polytetrafluoroethylene will provide a suitable bearing surface for the moving contact between the outer surface of the stem 18 and the inner axially extending surface of the seal 131. Further, the seal 61 of FIG. 5 could be suitably utilized in the top two seals 56. These two uppermost seals would primarily be in moving contact with the outer surface of the stem 18 and the inner axially extending surfaces of the seals.

It can be seen from the above, that the line pressure and/or the sealant lubricant pressure can be considered to be an energizing force which ultimately results in the seals 56 being brought into intimate sealing contact with the stem 18 and the ring 27 as well as the inner surface of the casing 12 and the downward radially extending face of the stop member 68.

It should also be noted that the annular rim 48 performs a backseat function as well as the functions above noted. If, for example, it is necessary to replace the seals 56, it can be seen from FIGS. 1 and 2 that upon removal of the threaded bolts 64 which allow removal of the stop member 68 after removal of the stop collar 70 the seals will be exposed. When the stem cap 62 is so removed the stem 18 will tend to move in an axial outward direction and at that point the annular rim 48 at its outward facing radially extending face 35 will backseat on a radially extending face 37 formed on the casing 12.

As before mentioned, the various operational parts of the valve 10 may be assembled through the end of the casing through the opening covered by the end cap 14, i.e., the stem 18, thrust bearing and seal 50, equalizer ring 20, spring 106, spherical ball 110, plug 22, spherical plug thrust ball 34 etc. As the stem 18 is removed through the bottom of the casing 12, the ring 27 will abut the angular protrusion 39 provided on the casing 12 and will slide off the stem as it is withdrawn from the casing.

There is thus provided a uniquely configured plug valve 10 which incorporates pressure actuated rotating seals which effect an efficient and effective seal between the rotating stem 18 and casing 12. In addition, the plug valve 10 may be field maintained without any interruption of line flow. In addition, the plurality of seals 56 may be removed and replaced while the valve is installed in an operational mode.

Obviously, the present invention is not limited to the specific details as herein described, but is capable of other modifications and changes without departing from the spirit and scope of the appended claims.

I claim:

1. A packing for the stem of a valve which valve is comprised of a body, a closure member enclosed within said body and a stem rotatably mounted in an opening in said body one end of the stem being in drive connection with said closure member, said packing being independently formed and mounted on said stem in said opening and comprised of a plurality of discrete radially alternate and axially precompressed layers of polytetrafluoroethylene and graphite, the innermost layer of graphite being adjacent said stem to provide maximum lubricity, and means for axially compressing said packing in the opening to urge said packing radially into sealing contact with said stem and said body, said graphite layer being substantially thicker than said polytetrafluoroethylene layer to provide increased wear capability.

2. The invention defined in claim 1 in which said graphite layer is in the order of five times thicker than said polytetrafluoroethylene layer.

3. A valve comprised of a body, a closure member enclosed within said body, a stem rotatably mounted in an opening in said body, one end of said stem being in drive connection with said closure member, a packing being independently formed and mounted on said stem within said opening comprised of a plurality of discrete radially alternate and axially precompressed layers of polytetrafluoroethylene and graphite, the innermost layer of graphite being adjacent said stem to provide maximum lubricity, and means for axially compressing said packing to urge said packing in the opening radially into sealing contact with said stem and said body, said graphite layer being substantially thicker than said polytetrafluoroethylene layer to provide increased wear capability.

4. The invention defined in claim 3 in which said graphite layer is in the order of five times thicker than said polytetrafluoroethylene layer.

* * * * *